US012313202B2

United States Patent
Hallot

(10) Patent No.: US 12,313,202 B2
(45) Date of Patent: May 27, 2025

(54) METHOD AND SYSTEM FOR DIRECT ELECTRIC HEATING OF A DOUBLE-WALLED PIPE FOR TRANSPORTING FLUIDS

(71) Applicant: SAIPEM S.A., Montigny le Bretonneux (FR)

(72) Inventor: Raymond Hallot, Voisins le Bretonneux (FR)

(73) Assignee: SAIPEM S.A., Montigny le Bretonneux (FR)

( * ) Notice: Subject to any disclaimer, the term of this patent is extended or adjusted under 35 U.S.C. 154(b) by 891 days.

(21) Appl. No.: 17/259,363

(22) PCT Filed: Jun. 24, 2019

(86) PCT No.: PCT/FR2019/051536
§ 371 (c)(1),
(2) Date: Jan. 11, 2021

(87) PCT Pub. No.: WO2020/016498
PCT Pub. Date: Jan. 23, 2020

(65) Prior Publication Data
US 2021/0301964 A1   Sep. 30, 2021

(30) Foreign Application Priority Data

Jul. 16, 2018 (FR) .................................. 1856544

(51) Int. Cl.
*F16L 53/37* (2018.01)
*F16L 59/14* (2006.01)

(52) U.S. Cl.
CPC ............. *F16L 53/37* (2018.01); *F16L 59/143* (2013.01)

(58) Field of Classification Search
CPC . F16L 53/37; F16L 53/00; F16L 53/30; F16L 53/34; F16L 59/143; H05B 3/0004; H05B 2203/021
(Continued)

(56) References Cited

U.S. PATENT DOCUMENTS 4,303,826 A * 12/1981 Ando ...................... F16L 53/34
                                                       137/341
4,645,906 A *  2/1987 Yagnik .................... F16L 53/34
                                                       219/541
(Continued)

FOREIGN PATENT DOCUMENTS

GB        2084284 A       4/1982
WO    WO-9005266 A1 *     5/1990
(Continued)

OTHER PUBLICATIONS

International Search Report and Written Opinion from PCT Application No. PCT/FR2019/051536, Nov. 19, 2019.
(Continued)

*Primary Examiner* — Jeffrey T Carley
*Assistant Examiner* — Alba T Rosario-Aponte
(74) *Attorney, Agent, or Firm* — Workman Nydegger

(57) ABSTRACT

A method and system for Direct Electrical Heating of a Pipe-In-Pipe pipeline for transporting fluids includes mechanically connecting the steel inner shell to the steel outer shell at different intervals of the pipeline, establishing an electrical and thermal insulation between the inner shell and the outer shell, applying an alternating electric current between an outer surface of the inner shell and an inner surface of the outer shell over the entire length of the pipeline so as to heat the inner shell of the pipeline by Joule effect, and placing on the outer surface of the inner shell at least one layer made of resistive and ferromagnetic material
(Continued)

so as to increase the ratio of electric power transmitted to the inner shell.

10 Claims, 2 Drawing Sheets

(58) Field of Classification Search
USPC .................................. 219/534; 392/465, 468
See application file for complete search history.

(56) References Cited

U.S. PATENT DOCUMENTS

| | | |
|---|---|---|
| 6,264,401 B1 | 7/2001 | Langner et al. |
| 6,371,693 B1 | 4/2002 | Kopp et al. |
| 9,018,569 B2 | 4/2015 | Geertsen |
| 2015/0276113 A1* | 10/2015 | Bass ...................... B32B 27/32 |
| | | 392/468 |

FOREIGN PATENT DOCUMENTS

| | | |
|---|---|---|
| WO | 2015148162 A1 | 10/2015 |
| WO | 2015171902 A1 | 11/2015 |
| WO | WO-2018083396 A1 * | 5/2018 .............. F16L 53/34 |

OTHER PUBLICATIONS

Search Report from corresponding FR Application No. FR1856544, May 10, 2019.
Office Action in corresponding Egyptian Patent Application No. 2020122020, Nov. 12, 2022.

* cited by examiner

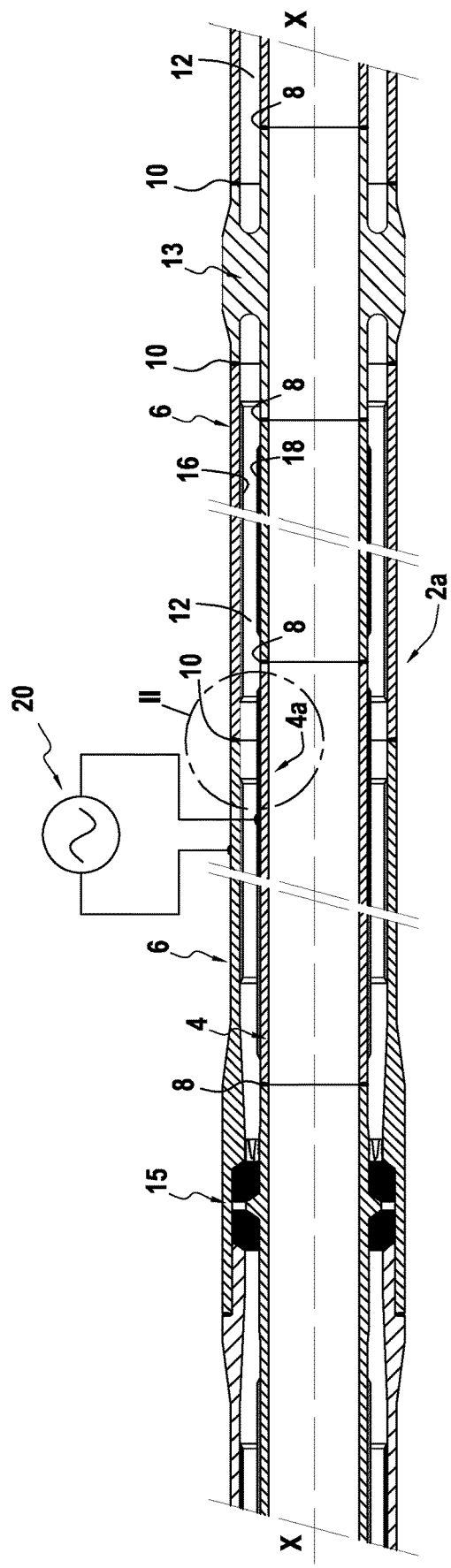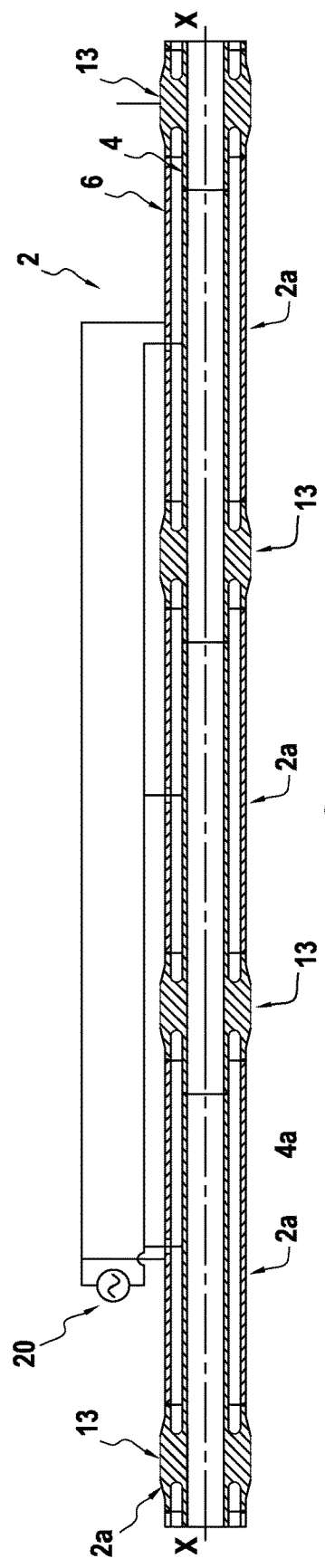

METHOD AND SYSTEM FOR DIRECT ELECTRIC HEATING OF A DOUBLE-WALLED PIPE FOR TRANSPORTING FLUIDS

BACKGROUND OF THE INVENTION

The present invention relates to the general field of electrical heating of metal pipelines for transporting fluids, and particularly subsea pipelines lying on the seabed and ensuring a linking between wells for producing subsea hydrocarbons, in particular oil and gas, and a surface installation, for example a production, storage and offloading floating unit.

It concerns more specifically the electrical heating of the double-shelled subsea pipelines of the "Pipe-In-Pipe" or PIP type, in which an inner shell transports the fluids and an outer shell coaxial with the inner shell is in contact with the surrounding environment, that is to say with sea water.

In the same offshore hydrocarbon production field, it is common to exploit several wells which can be separated from each other by several kilometers or even tens of kilometers. The fluids coming from these different wells must be collected by metal subsea pipelines (typically made of steel) laid on the seabed and transferred by bottom/surface linking pipelines to a surface installation, for example a platform, a ship or a land collection point, which will collect them to store them (and possibly treat them).

The fluids coming from the production wells tend to cool down very quickly as they travel the many kilometers of subsea pipelines. However, if no measures are taken to maintain a minimum threshold temperature inside these pipelines, there is a significant risk that the gas molecules, in particular methane, contained in the transported fluids combine with the water molecules to form, at low temperature, hydrate crystals. These can stick to the walls, agglomerate therewith and lead to the formation of plugs capable of blocking the flow of fluids inside the pipelines. Likewise, the solubility in oil of the high molecular weight compounds, such as paraffins or asphaltenes, decreases when the temperature drops, which gives rise to solid deposits in turn capable of blocking the flow.

It is known to resort to passive solutions to try to overcome this problem. These passive solutions essentially consist in positioning an insulating material in the annular space delimited between the inner shell and the outer shell of the pipeline, this insulating material possibly being a dry or a wet material or even vacuum.

It is also known to resort to active solutions in order to try to overcome this problem. One of these solutions consists in heating the inner shell of the pipeline with round or flat electric cables, which are disposed around the inner shell along its entire length in order to heat it by Joule effect. The electric power supplied to the electric cables comes from an external electric generator connected to the cables by an umbilical. This electrical heating solution which is called "heat tracing" allows maintaining the fluids transported in the pipelines at a temperature above a critical threshold throughout their path from the production well up to the surface installation.

Another known active solution in which the invention is more particularly interested consists in heating the subsea pipeline by applying an alternating electric current directly to the steel inner shell of the pipeline, the outer shell also made of steel being used as a conductor for the electric current return path. The alternating electric current traveling through the inner shell thus allows heating the latter by Joule effect. More specifically, the heating of the inner shell is produced by Joule effect by the current passing therethrough; much of the heat produced is transmitted to the fluids in the inner shell, the thermal losses through the insulator being relatively reduced. This electrical heating solution which is called "Direct Electrical Heating" (or DEH) has the advantage of being relatively simple in design compared in particular to the heat tracing solution.

On the other hand, the main drawback of the Direct Electrical Heating solution lies in its low performance, typically on the order of about 50% to 60%. Indeed, the heat dissipated by Joule effect by the current traveling through the outer shell is largely lost in the environment since the outer shell is in direct contact with sea water. Such Direct Electrical Heating solutions are known from Documents GB 2 084 284, WO 2015/148162, U.S. Pat. Nos. 6,264,401 and 6,371,693.

OBJECT AND SUMMARY OF THE INVENTION

The main object of the present invention is therefore to overcome such drawbacks by proposing a Direct Electrical Heating method and system which has a much higher performance.

This aim is achieved thanks to a method for Direct Electrical Heating of a Pipe-In-Pipe pipeline for transporting fluids, the pipeline comprising a steel inner shell intended to transport fluids and a steel outer shell positioned around the inner shell while being coaxial therewith in order to delimit an annular space therewith, the method comprising mechanically connecting the inner shell to the outer shell at different intervals of the pipeline, establishing an electrical and thermal insulation between the inner shell and the outer shell over the entire length of the pipeline, and applying an alternating electric current between an outer surface of the inner shell and an inner surface of the outer shell over the entire length of the pipeline so as to heat the inner shell of the pipeline by Joule effect, the method further comprising, in accordance with the invention, placing on the inner surface of the outer shell over the entire length of the pipeline a jacket made of conductive and non-magnetic material and/or placing on the outer surface of the inner shell over the entire length of the pipeline at least one layer made of resistive and ferromagnetic material so as to increase the ratio of electric power transmitted to the inner shell.

The inventors have observed that the application on the inner surface of the outer shell of a jacket made of a conductive and non-magnetic material allows significantly improving the ratio of electric power transmitted to the inner shell, and thus obtaining a performance of at least 90% and up to 95% depending on the electromagnetic characteristics of the present materials. Likewise, the application on the outer surface of the inner shell of a layer made of resistive and ferromagnetic material has the effect of substantially increasing the ratio of electric power transmitted to the inner shell in order to obtain a performance of at least 85% and up to 90% depending on the electromagnetic characteristics of the present materials. Finally, when applying both the jacket made of conductive and non-magnetic material and the layer made of resistive and ferromagnetic material, it is possible to obtain a performance of up to 98%.

The alternating electric current which flows on the outer surface of the inner shell by skin effect and on the inner surface of the outer shell by proximity effect over the entire length of the pipeline can have a frequency of 50 Hz or 60 Hz.

The alternating electric current can be applied at a single point in the pipeline. Alternatively, the alternating electric current can be applied at several points of the pipeline each corresponding to at least one pipeline section, each pipeline section comprising an inner shell section and an outer shell section.

Placing the jacket made of conductive and non-magnetic material may comprise inserting a tube made of conductive and non-magnetic material inside the outer shell, then expanding under pressure the tube against the inner surface of the outer shell.

Correspondingly, the invention also relates to a Direct Electrical Heating system of a Pipe-In-Pipe pipeline for transporting fluids, the pipeline comprising a steel inner shell intended to transport fluids and a steel outer shell positioned around the inner shell while being coaxial therewith to delimit an annular space therewith, the system comprising a plurality of mechanical links between the inner shell and the outer shell which are positioned at different intervals of the pipeline, an electrical and thermal insulation between the inner shell and the outer shell which is positioned over the entire length of the pipeline, and an alternating electric current generator applied between an outer surface of the inner shell and an inner surface of the outer shell over the entire length of the pipeline so as to heat the inner shell of the pipeline by Joule effect, and further comprising, in accordance with invention, a jacket made of conductive and non-magnetic material positioned on the inner surface of the outer shell over the entire length of the pipeline, and/or at least one layer made of resistive and ferromagnetic material positioned on the outer surface of the inner shell over the entire length of the pipeline so as to increase the ratio of electric power transmitted to the inner shell.

The jacket made of conductive and non-magnetic material is advantageously made of aluminum, copper, bronze, brass or zinc. Preferably, it has a thickness comprised between 1 and 6 mm.

As for the layer made of resistive and ferromagnetic material, it is advantageously made of electrical steel or amorphous metal. Preferably, it has a thickness comprised between 1 and 3 mm.

The mechanical links between the inner shell and the outer shell of the pipeline can be annular shoulders evenly spaced over the entire length of the pipeline.

The inner shell and the outer shell of the pipeline may each comprise a plurality of shell sections connected end-to-end to each other by weld beads, the jacket made of conductive and non-magnetic material and the layer made of resistive and ferromagnetic material having discontinuities at the weld beads.

In this case, the electrical continuity of the jacket made of conductive and non-magnetic material and of the layer made of resistive and ferromagnetic material can be achieved, either directly through the inner and outer shells, or indirectly through a conductive annular ring or a conductive sleeve which are positioned at the weld beads.

BRIEF DESCRIPTION OF THE DRAWINGS

Other characteristics and advantages of the present invention will emerge from the description given below, with reference to the appended drawings which illustrate exemplary embodiments thereof without any limitation. In the figures:

FIG. 1 is a schematic view of a Pipe-In-Pipe subsea pipeline for transporting hydrocarbons provided with a Direct Electrical Heating system according to one embodiment of the invention;

FIG. 5 is a schematic view of a Pipe-In-Pipe subsea pipeline for transporting hydrocarbons provided with a Direct Electrical Heating system according to another embodiment of the invention.

DETAILED DESCRIPTION OF THE INVENTION

The invention concerns the Direct Electrical Heating of any land or subsea metal pipeline for transporting fluids, and in particular the Direct Electrical Heating of the Pipe-In-Pipe steel subsea pipelines lying at the seabed and ensuring a transport between wells for producing subsea hydrocarbons, in particular oil and gas, and a surface installation.

Figure 2:
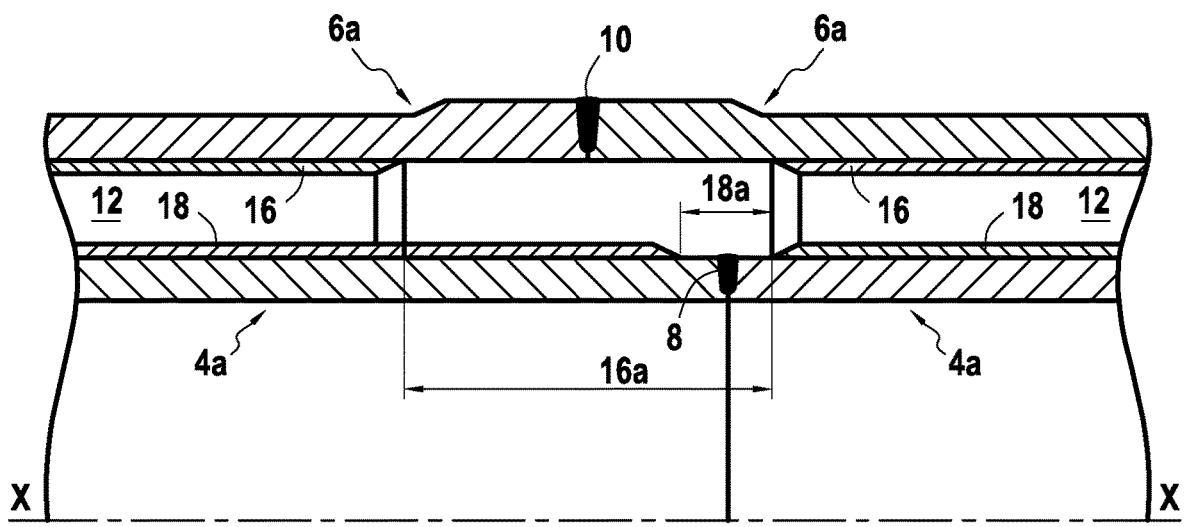
FIG. 2 is a magnifying glass of FIG. 1.

A subsea pipeline of the "Pipe-In-Pipe" (PIP) type as represented in FIGS. 1 and 2 is a pipeline 2 which comprises an inner shell 4 centered on a longitudinal axis XX and intended to transport hydrocarbons coming from production wells, and an outer shell 6 disposed around the inner shell while being coaxial therewith and intended to be in direct contact with the surrounding seawater.

The inner 4 and outer 6 shells of the subsea pipeline are typically made of carbon steel. Of course, other electrically conductive materials could be used for these shells, in particular alloy steel (stainless steel type), aluminum, copper, carbon, etc.

This type of subsea pipeline is typically used in offshore production of hydrocarbons at great depth. Within the framework of such installations, the Pipe-In-Pipe pipelines can be assembled onshore into several pipeline sections 2a, each pipeline section comprising an inner shell section 4a and an outer shell section 6a.

As represented in FIG. 2, the inner shell sections 4a are connected end-to-end to each other by weld beads 8 to form the inner shell of the pipeline. Likewise, the outer shell sections 6a are connected end-to-end to each other by weld beads 10 to form the outer shell of the pipeline.

In addition, the inner shell sections 4a and the outer shell sections 6a delimit therebetween annular spaces 12 which comprise electrical and thermal insulation means (not represented in the figures). Typically, these insulation means can be in the form of a vacuum or filled with a thermal insulating material.

At each end of the inner and outer shells of the pipeline, the annular spaces 12 are sealingly closed by metal bulkheads 13. These bulkheads ensure a mechanical and electrical connection between the inner shell and the outer shell.

Furthermore, at different intervals over the entire length of the pipeline, the inner shell and the outer shell are connected to each other by intermediate links 15, commonly called "intermediate bulkheads", which allow holding together the shells in coaxial position. These intermediate links 15 are electrically insulated (no electric current passes therethrough). For example, it is possible to use rings made of elastomer or of polymer.

In addition, as indicated above, the shell sections which form the inner shell and the outer shell of the pipeline are connected to each other by weld beads 8, 10.

According to the invention, it is provided to place a jacket made of conductive and non-magnetic material 16 on the inner surface of the outer shell 6 over the entire length of the pipeline and/or a layer made of resistive and ferromagnetic material 18 on the outer surface of the inner shell 4 over the entire length of the pipeline to be heated.

As will be discussed below, the presence of such a jacket made of conductive and non-magnetic material 16 and/or of such a layer made of resistive and ferromagnetic material 18 allows increasing the ratio of electric power transmitted to the inner shell during the application of an electric current for heating the subsea pipeline.

Still according to the invention, an alternating electric current is applied from a single-phase power supply 20 between the outer surface of the inner shell 4 and the inner surface of the outer shell 6 over the entire length of the pipeline so as to heat the inner shell of the pipeline by Joule effect. In practice, one of the two cables of the phase is connected on the outside of the inner shell, and the other on the inside of the outer shell.

More specifically, the heating of the inner shell of the pipeline is obtained by a combination of interactive effects which comprise in particular electrical resistance effects and electromagnetic effects (such as skin and proximity effects).

The electric current which flows on the outer surface of the inner shell 4 by skin effect and on the inner surface of the outer shell 6 of the pipeline by proximity effect is typically an alternating electric current (sinusoidal or non-sinusoidal) having a frequency on the order of 50 Hz or 60 Hz.

The inventors have observed that the efficiency of a Direct Electrical Heating as described above is increased in two ways: by increasing for the inner shell the electrical resistivity to magnetic permeability product and by decreasing for the outer shell the electrical resistivity to magnetic permeability product.

The inventors have also observed that the resistivity to permeability product of the inner shell can be increased by adding to the outer surface of the inner shell a layer made of resistive and ferromagnetic material. As for the resistivity to permeability product of the outer shell, it is increased by adding to the inner surface of the outer shell a jacket made of conductive and non-magnetic material. Furthermore, it should be noted that these results are obtained even without adhesion of the layer made of resistive and ferromagnetic material on the outer surface of the inner shell and without adhesion of the jacket made of conductive and non-magnetic material on the inner surface of the outer shell. Likewise, the layer made of resistive and ferromagnetic material may consist of a plurality of layers separated by a small space.

Furthermore, the jacket made of conductive and non-magnetic material 16 is preferably made of aluminum, copper, bronze, brass or zinc, materials giving the best results in terms of increase in the ratio of electric power transmitted to the inner shell. With such materials, a performance of up to 95% is obtained depending on the electrical characteristics of the present materials.

In addition, it has advantageously a thickness comprised between 1 and 6 mm in order to further maximize the gain in the ratio of electric power transmitted to the inner shell.

As for the layer made of resistive and ferromagnetic material 18, it is preferably made of electrical steel or amorphous metal or an alloy of nickel and iron (mu-metal). More specifically, electric steel (oriented or non-oriented grain steel) or Metglas® (amorphous metal alloy) will be chosen as material. With such materials, a performance of up to 90% is obtained depending on the electrical characteristics of the present materials.

In addition, it has advantageously a thickness comprised between 1 and 3 mm in order to further maximize the gain in the ratio of electric power transmitted to the inner shell.

The two tables below show efficiency calculations (i.e. calculations of the ratio of electric power transmitted to the inner shell) for different Pipe-In-Pipe pipelines (No. 1 to No. 8).

|       | unit | Pipeline No.1 | Pipeline No.2 | Pipeline No.3 |
|-------|------|---------------|---------------|---------------|
| d_i   | mm   | 558.8         | 558.8         | 558.8         |
| e_i   | mm   | 31.75         | 31.75         | 31.75         |
| d_e   | mm   | 736.6         | 736.6         | 736.6         |
| e_e   | mm   | 34.925        | 34.925        | 34.925        |
| rho_i | Ω.m  | 0.00000013    | 0.00000013    | 0.0000012     |
| mu_i  | —    | 150           | 150           | 1,500         |
| rho_e | Ω.m  | 0.00000013    | 2.80E−08      | 1.30E−07      |
| mu_e  | —    | 150           | 1             | 150           |
| eta   | —    | 0.544         | 0.969         | 0.920         |

|       | unit | Pipeline No.4 | Pipeline No.5 | Pipeline No.6 |
|-------|------|---------------|---------------|---------------|
| d_i   | mm   | 558.8         | 558.8         | 558.8         |
| e_i   | mm   | 31.75         | 31.75         | 31.75         |
| d_e   | mm   | 736.6         | 736.6         | 736.6         |
| e_e   | mm   | 34.925        | 34.925        | 34.925        |
| rho_i | Ω.m  | 0.0000012     | 0.00000058    | 0.00000058    |
| mu_i  | —    | 1,500         | 750           | 750           |
| rho_e | Ω.m  | 2.80E−08      | 1.30E−07      | 2.80E−08      |
| mu_e  | —    | 1             | 150           | 1             |
| eta   | —    | 0.997         | 0.849         | 0.993         |

In the tables above:
"d_i" refers to the outer diameter of the inner shell;
"e_i" refers to the thickness of the inner shell;
"d_e" refers to the inner diameter of the outer shell;
"e_e" refers to the thickness of the outer shell;
"rho_i" refers to the resistivity of the inner shell;
"mu_i" refers to the permeability of the inner shell;
"rho_e" refers to the resistivity of the outer shell;
"mu_e" refers to the permeability of the outer shell;
"eta" refers to the efficiency (comprised between 0 and 1);
The pipeline No. 1 corresponds to a steel pipeline of the prior art described in the publication WO 2015/148162;
The pipeline No. 2 corresponds to a steel pipeline of the prior art described in particular in the publication WO 2015/148162 and whose inner surface of the outer shell comprises a jacket made of aluminum according to the principle of the invention;
The pipeline No. 3 corresponds to a steel pipeline of the prior art described in particular in the publication WO 2015/148162 and whose outer surface of the inner shell comprises a layer made of Metglas® according to the principle of the invention;
The pipeline No. 4 corresponds to a steel pipeline of the prior art described in particular in the publication WO 2015/148162 and whose inner surface of the outer shell comprises a jacket made of aluminum and outer surface of the inner shell comprises a layer made of Metglas® according to the principle of the invention;
The pipeline No. 5 corresponds to a steel pipeline of the prior art described in particular in the publication WO 2015/148162 and whose outer surface of the inner shell comprises a layer made of mu-metal according to the principle of the invention; and
The pipeline No. 6 corresponds to a steel pipeline of the prior art described in particular in the publication WO 2015/148162 and whose inner surface of the outer shell comprises a jacket made of aluminum and outer surface of the inner shell comprises a layer made of mu-metal according to the principle of the invention.

It emerges from these tables that the principle according to the invention of applying a jacket made of conductive and non-magnetic material on the inner surface of the outer shell and/or a layer made of resistive and ferromagnetic material on the outer surface of the inner shell allows significantly increasing the efficiency of the electrical heating of the pipeline, this efficiency switching from 0.544 for the steel pipeline of the prior art as described in the publication WO 2015/148162 to more than 0.84 for the same pipelines provided with a jacket and/or a layer according to the invention.

Moreover, as represented in FIG. 2, the jacket made of conductive and non-magnetic material 16 and the layer made of resistive and ferromagnetic material 18 each have discontinuities (respectively 16a and 18a) at the weld beads 15a, 15b. These discontinuities 16a, 18a, which extend longitudinally on either side of the weld beads, are necessary to produce the weld beads between the inner and outer shell sections of the pipeline.

These discontinuities 16a, 18a can cause very little loss in performance. However, this loss is acceptable insofar as, in the absence of reconstitution of these discontinuities, the electrical continuity of the jacket made of conductive and non-magnetic material and of the layer made of resistive and ferromagnetic material is achieved directly through the inner and outer shells of the pipeline thanks to the flow of the electric current in the wall of the carbon steel of the inner and outer shells.

Figure 3:
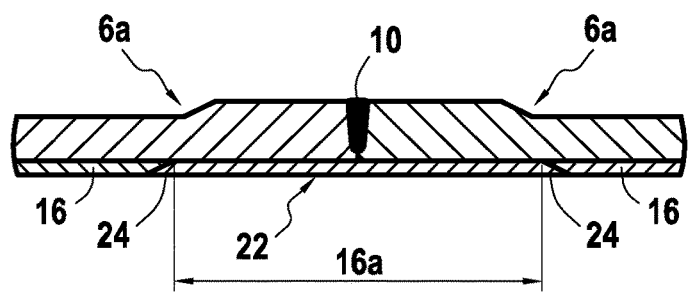
FIGS. 3 and 4 show alternative embodiments of the electrical continuity of the jacket made of conductive and non-magnetic material and of the layer made of resistive and ferromagnetic material at the weld beads.

According to an alternative, in order to avoid this very low loss in performance, it is possible, as represented in FIG. 3, to ensure the electrical continuity of the jacket 16 made of conductive and non-magnetic material through a conductive annular ring 22 positioned at the weld beads.

This ring 22 made of conductive material allows ensuring, by means of flexible tabs or blades 24, an electrical continuity between the two ends of each discontinuity 16a.

Figure 4:
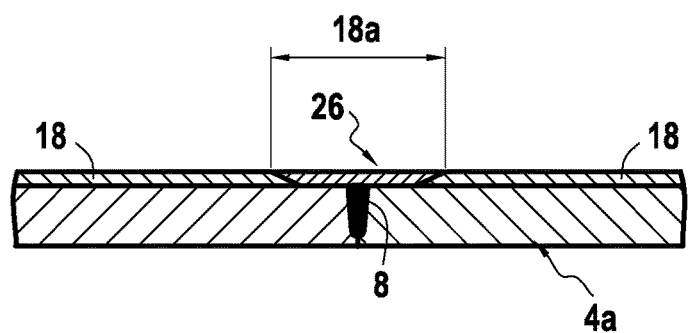

According to another alternative represented in FIG. 4, the electrical continuity of the layer 18 made of resistive and ferromagnetic material is achieved through a conductive annular sleeve 26 positioned at the weld beads 8a and linking the ends of the discontinuities 18a.

In addition, there are different methods for placing the jacket made of conductive and non-magnetic material 16 inside the outer shell 6 of the pipeline.

One of these methods consists in inserting a tube made of conductive and non-magnetic material inside the outer shell, then in carrying out its expansion under pressure (for example under a hydraulic pressure of several hundred bar) against the inner surface of the outer shell to allow it to match the profile thereof.

Another method consists in inserting inside the outer shell a tube made of conductive and non-magnetic material which is split and closed, then in releasing it once in place in the outer shell in order to allow it to lie against the inner surface of the latter. This split tube can also be force-fitted into the outer shell by pulling it through one of its ends.

Yet another method consists in using longitudinal gutter strips made of conductive and non-magnetic material to slide them inside the outer shell and weld them at the ends of the latter.

Yet another method consists in producing the jacket made of conductive and non-magnetic material by spraying powder under plasma torch onto the inner surface of the outer shell of the pipeline. This powder spraying can also be carried out only at the ends of the outer shell to serve as a weldable area for a tube or longitudinal strips inserted inside the outer shell.

Finally, yet another method consists in producing the jacket made of conductive and non-magnetic material by thick galvanizing.

In the exemplary embodiment of FIG. 1, the alternating electric current to heat the shell is internal and applied in the middle of the pipeline, that is to say at equal distance from the two bulkheads 13. The currents of electric cables of the power supply are then divided into two currents of equal intensity each traveling through one half of the pipeline, between the midpoint of the latter and one of the ends through the body of the inner shell, then between the end and the middle of the pipeline through the body of the outer shell, the electrical continuity between the two shells being ensured by the bulkheads 13.

FIG. 5 represents an alternative embodiment of the invention in which the pipeline 2, and more specifically its inner shell 4, is heated by applying an alternating electric current at several points of the pipeline.

Preferably, these points of application of the electric current each correspond to at least one pipeline section 2a. In this case, the inner shell sections and the outer shell sections of each pipeline section are electrically insulated from each other for example at the bulkheads 13. In this example of FIG. 5, three pipeline sections 2a are each supplied with electric current independently and in their middle by the single-phase power supply 20. Thus, the current of a pipeline section passes from the inner shell to the outer shell by passing through the adjacent surface of the bulkhead, and similarly for the adjacent pipeline section. In other words, in this multi-power configuration of the pipeline, the two inner faces of the bulkheads are traversed by currents each coming from the electrical networks on either side of the bulkheads.

The invention claimed is:

1. A Direct Electrical Heating system of a Pipe-In-Pipe pipeline for transporting fluids, the pipeline comprising a steel inner shell intended to transport fluids and a steel outer shell positioned around the inner shell while being coaxial therewith to delimit an annular space therewith, the system comprising:
    a plurality of mechanical links between the inner shell and the outer shell which are positioned at different intervals of the pipeline;
    an electrical and thermal insulation between the inner shell and the outer shell which is positioned over an entire length of the pipeline;
    an alternating electric current generator applied between an outer surface of the inner shell and an inner surface of the outer shell over the entire length of the pipeline so as to heat the inner shell of the pipeline by Joule effect;
    at least one layer made of resistive and ferromagnetic material positioned on the outer surface of the inner shell over the entire length of the pipeline so as to increase a ratio of electric power transmitted to the inner shell; and
    a jacket made of conductive and non-magnetic material positioned on the inner surface of the outer shell over the entire length of the pipeline;
    wherein electrical resistivity to magnetic permeability product for the inner shell is increased and electrical resistivity to magnetic permeability product for the outer shell is decreased; and wherein the jacket is arranged to be split and closed for insertion within the outer shell of the pipeline, and then released once placed in the outer shell to allow the jacket to lie against the inner surface of the outer shell.

2. The system according to claim 1, wherein the jacket made of conductive and non-magnetic material is made of aluminum, copper, bronze, brass or zinc.

3. The system according to claim 1, wherein the jacket made of conductive and non-magnetic material has a thickness comprised between 1 and 6 mm.

4. The system according to claim 1, wherein the layer made of resistive and ferromagnetic material is made of electrical steel or amorphous metal.

5. The system according to claim 1, wherein the layer made of resistive and ferromagnetic material has a thickness comprised between 1 and 3 mm.

6. The system according to claim 1, wherein the mechanical links between the inner shell and the outer shell of the pipeline are annular shoulders evenly spaced over the entire length of the pipeline.

7. The system according to claim 1, wherein the inner shell and the outer shell of the pipeline each comprise a plurality of shell sections connected end-to-end to each other by weld beads, the jacket made of conductive and non-magnetic material and the layer made of resistive and ferromagnetic material having discontinuities at the weld beads.

8. The system according to claim 7, wherein electrical continuity of the jacket made of conductive and non-magnetic material and of the layer made of resistive and ferromagnetic material is achieved directly through the inner and outer shells.

9. The system according to claim 1, wherein the layer made of resistive and ferromagnetic material is devoid of adhesive on the outer surface of the inner shell.

10. The system according to claim 1, wherein the jacket made of conductive and non-magnetic material is devoid of adhesive on the inner surface of the outer shell.

* * * * *